US 6,730,425 B2

(12) United States Patent
Ishikawa

(10) Patent No.: US 6,730,425 B2
(45) Date of Patent: May 4, 2004

(54) FUEL CELL SYSTEM HAVING COOL APPARATUS

(75) Inventor: Tetsuhiro Ishikawa, Nishikamo-gun (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 214 days.

(21) Appl. No.: 09/903,751

(22) Filed: Jul. 13, 2001

(65) Prior Publication Data
US 2002/0031693 A1 Mar. 14, 2002

(30) Foreign Application Priority Data
Jul. 14, 2000 (JP) .......................... 2002-213910

(51) Int. Cl.$^7$ ................................ H01M 8/04
(52) U.S. Cl. .................. 429/26; 429/24; 429/34
(58) Field of Search ................ 429/26, 24, 34

(56) References Cited

U.S. PATENT DOCUMENTS 4,362,789 A * 12/1982 Dighe ................ 429/26 X
2001/0050191 A1 * 12/2001 Ogawa et al.
2002/0009648 A1 * 1/2002 Buchner et al. ........ 429/26 X

FOREIGN PATENT DOCUMENTS

JP  8-185877  7/1996

* cited by examiner

Primary Examiner—John S. Maples
(74) Attorney, Agent, or Firm—Oblon, Spivak, McClelland, Maier & Neustadt, P.C.

(57) ABSTRACT

A cooling apparatus that cools a fuel cell has a first forced circulation cooling system that directly cools the fuel cell, a second forced circulation cooling system that is independent of the first forced circulation cooling system, and an intermediate cooling system that exchanges heat with each of the first and second forced circulation cooling systems. A container provided in the intermediate cooling system contains an electrically insulating liquid as a coolant.

20 Claims, 3 Drawing Sheets

FUEL CELL SYSTEM HAVING COOL APPARATUS

INCORPORATION BY REFERENCE

The disclosure of Japanese Patent Application No. 2000-213910 filed on Jul. 14, 2000 including the specification, drawings and abstract is incorporated herein by reference in its entirety.

BACKGROUND OF THE INVENTION

1. Field of the Invention

The invention relates to a technology for cooling a fuel cell in a fuel cell system.

2. Description of the Related Art

Fuel cells that generate electric power by utilizing an electrochemical reaction between hydrogen and oxygen are expected as a next-generation energy source. During operation (power generation) of a fuel cell, a considerable amount of heat is produced by the electrochemical reaction. Therefore, an ordinary fuel cell system has a cooling apparatus for cooling the fuel cell.

Japanese Patent Application Laid-Open No. 8-184877, for example, describes a cooling apparatus of a fuel cell system. In this apparatus, the fuel cell is cooled through the use of a coolant that includes an antifreezing solution containing water and ethylene glycol.

However, since the antifreezing solution containing water and ethylene glycol is capable of conducting electricity, it is difficult for the aforementioned prior art cooling apparatus in some cases to maintain a sufficiently high level of insulation of the fuel cell system.

SUMMARY OF THE INVENTION

It is an object of the invention to provide a technology that allows an easy improvement in the insulation of a fuel cell of a fuel cell system.

A fuel cell system is provided with a fuel cell and a cooling apparatus that cools the fuel cell. The cooling apparatus of the fuel cell system includes a first forced circulation cooling system that cools the fuel cell by forcibly circulating a coolant through a circulation passage that extends through the fuel cell. The cooling apparatus uses an electrically insulating solution as a coolant contained in at least a portion of the cooling apparatus.

In this fuel cell system, the fuel cell cooling apparatus uses an electrically insulating coolant, so that the fuel cell can easily be electrically insulated from the outside. Therefore, it is possible to enhance the insulation of the fuel cell system easily.

The cooling apparatus of the fuel cell system is provided with a second forced circulation cooling system that is independent of the first forced circulation cooling system, and an intermediate cooling system that is operable to exchange heat with the first forced circulation cooling system and with the second forced circulation cooling system. The intermediate cooling system contains the electrically insulating solution as a coolant.

Since the coolant used in the intermediate cooling system is an electrically insulating liquid, this construction eliminates the need to consider electrical insulation with regard to the first and second forced circulation cooling systems. Therefore, it is possible to enhance the insulation of the fuel cell system easily.

The intermediate cooling system of the fuel cell system has a container that houses therein the electrically insulating liquid. The electrically insulating solution exchanges heat with the first forced circulation cooling system and with the second forced circulation cooling system while naturally circulating in the container.

This construction has an advantage of simplifying the construction of the intermediate cooling system.

The electrically insulating liquid contained in the intermediate cooling system of the fuel cell system is allowed to boil in the container with a heat derived from the first forced circulation cooling system.

If boiling heat transfer is utilized, the rate of heat transfer to the electrically insulating liquid increases. Therefore the cooling efficiency can be improved.

Each of the first forced circulation cooling system and the second forced circulation cooling system has a heat exchange acceleration portion that accelerates heat exchange with the electrically insulating liquid in the intermediate cooling system.

This construction may improve the cooling efficiency of the intermediate cooling system.

The second forced circulation cooling system has a heat dissipation portion that dissipates heat to an atmosphere.

This construction may improve the cooling efficiency of the second forced circulation cooling system.

The electrically insulating liquid has an antifreezing property.

This construction may expand the temperature range in which the fuel cell system can be operated.

The electrically insulating solution includes a fluorine-based inert liquid or an insulating oil.

A fluorine-based inert liquid or an insulating oil is electrically insulating and antifreezing properties, and therefore are preferable as an electrically insulating coolant.

The invention may be realized in various forms. For example, the invention can be realized in the form of a fuel cell system, a fuel cell cooling system, a cooling method, and the like.

DETAILED DESCRIPTION OF PREFERRED EMBODIMENTS

First Embodiment

Figure 1:
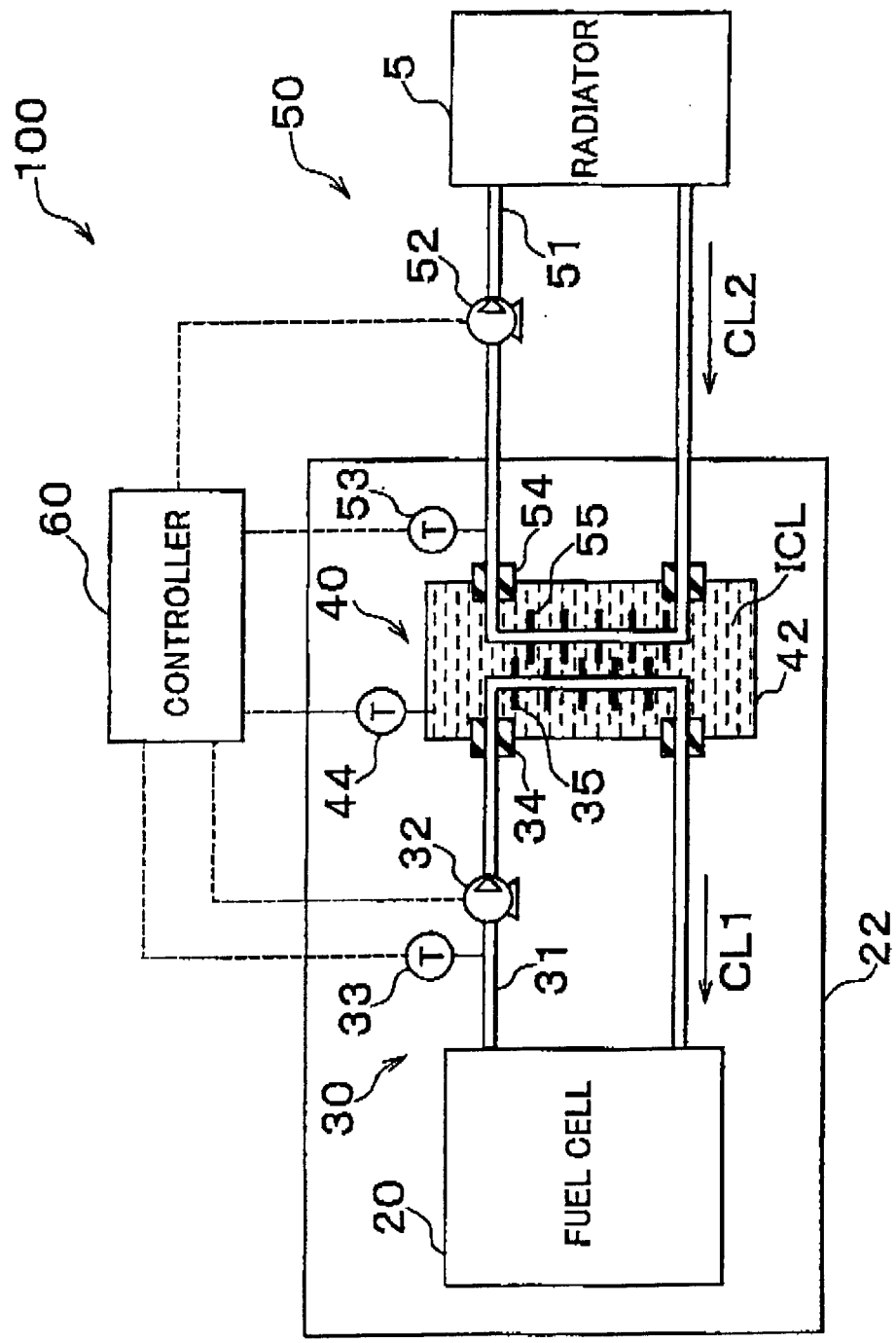
FIG. 1 is a schematic diagram illustrating a construction of a fuel cell system in accordance with a first embodiment of the invention.

FIG. 1 is a schematic diagram illustrating a construction of a fuel cell system 100 in accordance with a first embodiment of the invention. The fuel cell system 100 includes a fuel cell 20 and a cooling apparatus (cooling system) for cooling the fuel cell 20. The cooling apparatus has a first forced circulation cooling system 30 that directly cools the fuel cell 20, an intermediate cooling system 40 that exchanges heat with the first forced circulation cooling system 30, a second forced circulation cooling system 50 that exchanges heat with the intermediate cooling system 40, and a controller 60 for controlling the entire fuel cell system.

The fuel cell 20, the first forced circulation cooling system 30 and the intermediate cooling system 40 are housed within a fuel cell case 22.

The first forced circulation cooling system 30 has a metal-made pipe 31 that constitutes a circulation passage for circulation between the fuel cell 20 and a heat exchanger 42 of the intermediate cooling system 40. The pipe 31 is provided with a pump 32 and a temperature sensor 33. The controller 60 controls the operation of the pump 32 in accordance with the temperature of a coolant measured by the temperature sensor 33. A container of the intermediate cooling system 40 and the pipe 31 are electrically insulated from each other by an insulator 34. However, outside the intermediate cooling system 40, the pipe 31 may be formed by an insulating material. In such a case, the insulator 34 is not needed. A piping of the pipe 31 that extends inside the intermediate cooling system 40 is provided with a plurality of fins 35 as a heat exchange accelerator that accelerates heat exchange. A first coolant CL1 that is circulated in the first forced circulation cooling system 30 is, for example, an antifreezing solution containing water and ethylene glycol.

The second forced circulation cooling system 50 has a radiator 5 as a heat dissipator for dissipating heat to an atmosphere. The second forced circulation cooling system 50 further has a metal-made pipe 51 that constitutes a circulation passage for circulation between the radiator 5 and the heat exchanger 42 of the intermediate cooling system 40. The pipe 51 is also provided with a pump 52 and a temperature sensor 53. The container of the intermediate cooling system 40 and the pipe 51 are electrically insulated from each other by an insulator 54. However, outside the intermediate cooling system 40, the pipe 51 may be formed by an insulating material. In such a case, the insulator 54 is not needed. A piping of the pipe 51 that extends inside the intermediate cooling system 40 is provided with a plurality of fins 55. A second coolant CL2 that is circulated in the second forced circulation cooling system 50 is, for example, an antifreezing solution containing water and ethylene glycol.

The second forced circulation cooling system 50 is independent of the first forced circulation cooling system 30. The term "independent" herein means that the circulation passages of the two systems are not in direct contact with each other. The arrangement in which the first and second forced circulation cooling systems 30, 50 are independent of each other is adopted so as to improve electrical insulation as described below.

The intermediate cooling system 40 has a construction in which a coolant ICL is contained in the sealed heat exchanger 42. The heat exchanger 42 is provided with a temperature sensor 44 for measuring the temperature of the coolant ICL. The first coolant CL1 of the first forced circulation cooling system 30 cools the fuel cell 20 while flowing through a cooling passage (not shown) therein, and transfers heat to the coolant ICL within the heat exchanger 42. The coolant ICL naturally circulates (convects) in the heat exchanger 42. Heat of the coolant ICL is transferred to the second coolant CL2 of the second forced circulation cooling system 50, and is dissipated from the radiator 5 to the outside.

The coolant ICL of the intermediate cooling system 40 is an electrically insulating liquid. The term "electrically insulating liquid" herein means a liquid having a volume resistivity of at least about $10^{12}$ $\Omega \cdot m$ at a room temperature. It is preferable that the volume resistivity of the coolant ICL be high, especially at least about $10^{16}$ $\Omega \cdot m$. The pipes 31, 51 are insulated from each other by the electrically insulating coolant ICL. That is, the second forced circulation cooling system 50 is electrically insulated from the fuel cell 20. Therefore, even if each of the coolants CL1, CL2 of the first and second forced circulation cooling systems 30, 50 is an electrically conductive antifreezing solution, the electrical insulation of the fuel cell system 100 will not be degraded. In the below description, the coolant ICL of the intermediate cooling system 40 will be simply referred to as an "insulating coolant ICL".

Furthermore, preferably the insulating coolant ICL may have an antifreezing property. The "antifreezing" means a property of remaining unfrozen at 0° C. The fuel cell system 100 shown in FIG. 1 employs antifreezing solution as the three kinds of coolants CL1, ICL, CL2, thereby achieving an advantage of eliminating the fear of a frozen coolant even in a cold area.

The insulating coolant ICL may be, for example, an insulating oil, a fluorine-based inert liquid such as Fluorinert™ of Sumitomo 3M, or the like. In particular, the fluorine-based inert liquid has advantages of high chemical stability and excellent heat transfer property.

Although in the embodiment shown in FIG. 1, the insulating coolant ICL naturally circulates in the heat exchanger 42, it is also practicable to boil the insulating coolant ICL in the heat exchanger 42. If the insulating coolant ICL is boiled in the heat exchanger 42, the rate of heat transfer to the insulating coolant ICL becomes high, so that the cooling efficiency in the heat exchanger 42 may be improved. As a result, it becomes possible to reduce the lengths of piping in the heat exchanger 42 of the first and second forced circulation cooling systems 30, 50 and the surface areas of the fins 35, 55. Hence, the size of the heat exchanger 42 can be reduced. Size reduction of the heat exchanger 42 makes it possible to reduce the amount of the insulating coolant ICL used. This advantage is remarkable particularly in the case of a fluorine-based inert liquid since the liquid is expensive.

If such boiling heat transfer mechanism is utilized, a space is formed in an upper portion within the heat exchanger 42 so as to secure a liquid surface of the insulating coolant ICL. The pumps 32, 52 are controlled so as to boil the insulating coolant ICL based on the temperatures measured by the temperature sensors 33, 44, 53. A coolant having a boiling temperature that is lower than the maximum allowable temperature of the first coolant CL1 is selected as the insulating coolant ICL. Normally, the maximum allowable temperature of the first coolant CL1 is determined by the maximum allowable temperature of the fuel cell 20. For example, if the maximum allowable temperature of the first coolant CL1 is about 100° C., the boiling point of the insulating coolant ICL is limited to the temperature less than 100° C. It is preferable that the insulating coolant ICL be liquid at a room temperature. Therefore, if the boiling heat transfer mechanism is utilized, it is preferable that the boiling temperature of the insulating coolant ICL be higher than the room temperature and lower than about 100° C.

If an insulating coolant ICL having a boiling temperature within the aforementioned specific range, it is possible to steadily operate the pumps 32, 53 without controlling the pumps 32, 52 based on temperature. In that case, at least one of the temperature sensors 32, 44, 53 can be omitted.

In the fuel cell system 100 of the first embodiment, the two forced circulation cooling systems 30, 50 are provided independently of each other, and the intermediate cooling system 40 employing the insulating coolant ICL is interposed between the two cooling systems 30, 50 as described above. Therefore, high electric insulation can be achieved.

Second Embodiment

Figure 2:
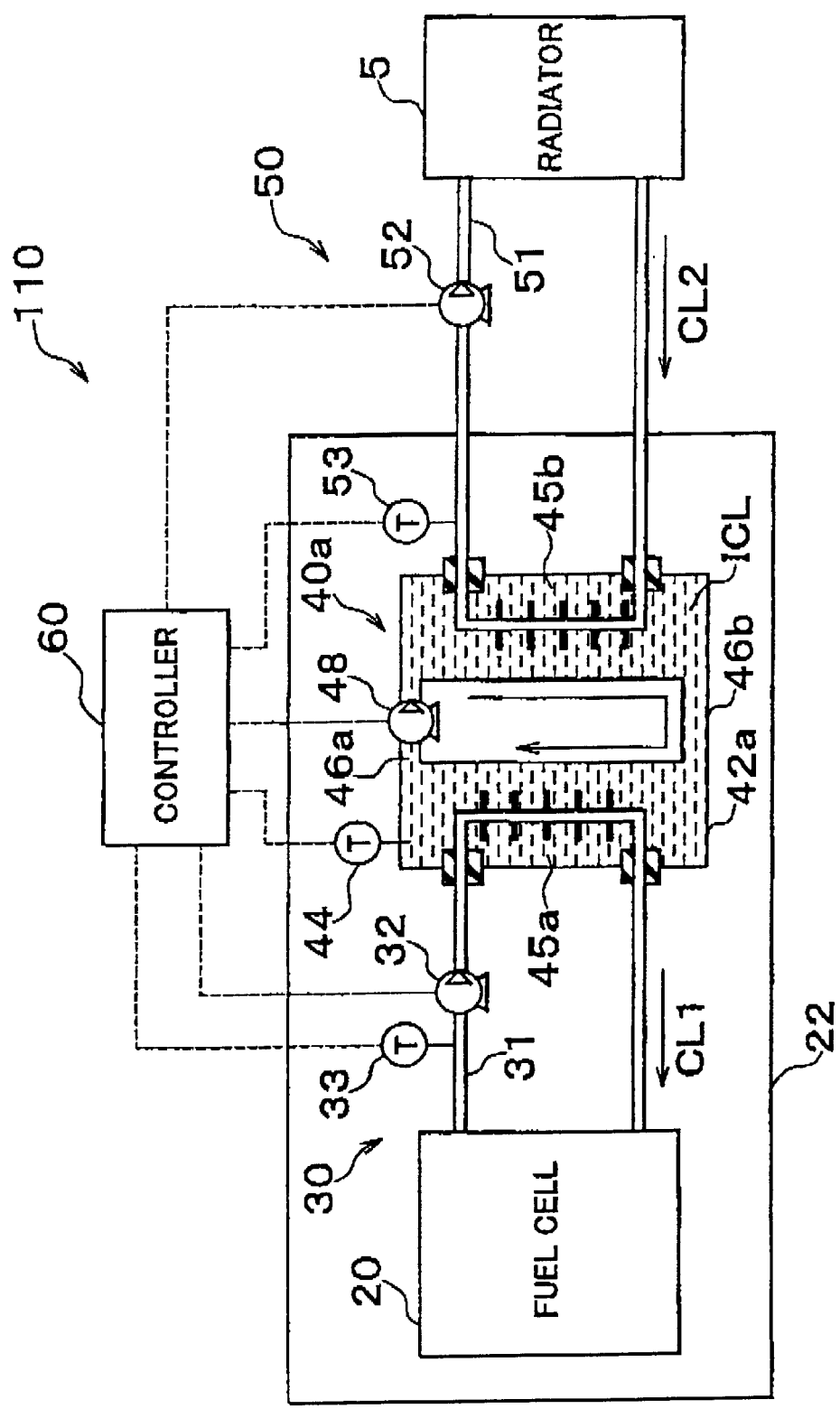
FIG. 2 is a schematic diagram illustrating a construction of a fuel cell system in accordance with a second embodiment.
Figure 3:
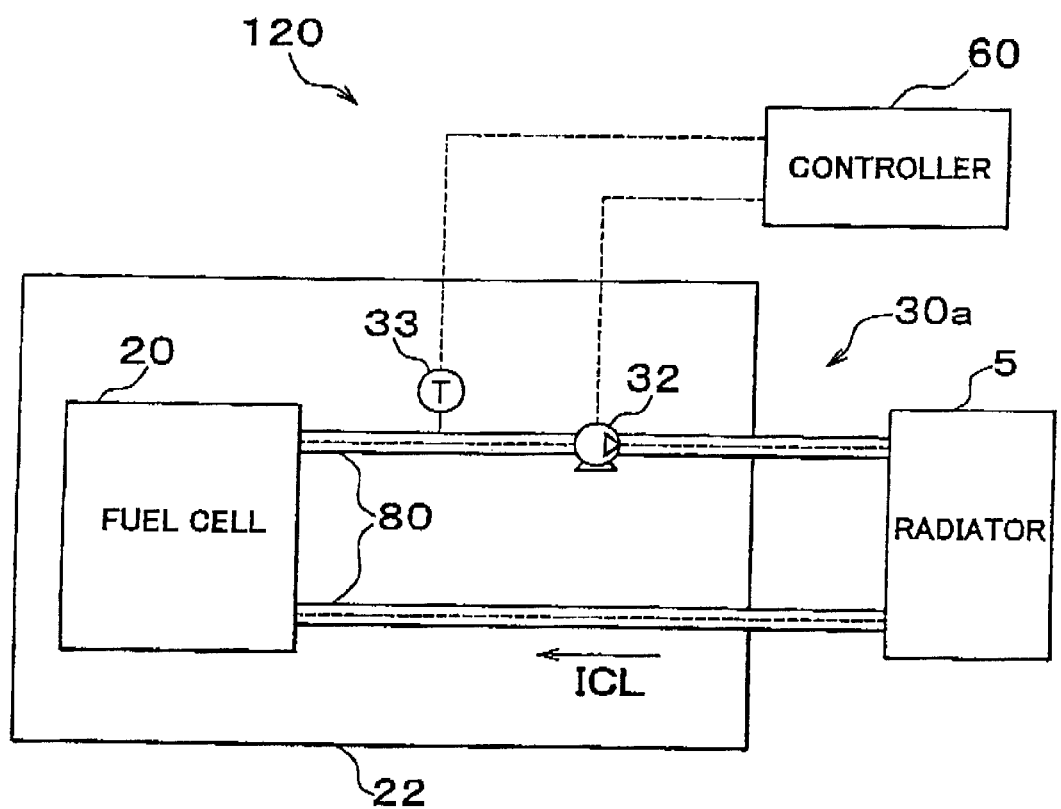
FIG. 3 is a schematic diagram illustrating a construction of a fuel cell system in accordance with a third embodiment.

FIG. 2 is a schematic diagram illustrating a construction of a fuel cell system 110 of a second embodiment of the invention. The fuel cell system 110 differs from the system of the first embodiment merely in an intermediate cooling system. Other arrangements of the second embodiment are substantially the same as those of the first embodiment. A container 42a of an intermediate cooling system 40a in the second embodiment has a first heat exchange chamber 45a in which a circulation passage 31 of a first forced circulation cooling system 30 extends, and a second heat exchange chamber 45b in which a circulation passage 51 of a second forced circulation cooling system 50 extends. The first heat exchange chamber 45a and the second heat exchange chamber 45b are interconnected via piping portions 46a, 46b. Of the two piping portions 46a, 46b, the piping portion 46a is provided with a pump 48. When the pump 48 is operated, an insulating coolant ICL is forced to circulate in the container 42a.

In the fuel cell system 110 of the second embodiment, high insulation can be achieved as in the first embodiment. Furthermore, in the second embodiment, due to the forced circulation of the insulating coolant ICL, the rate of heat transfer to the insulating coolant becomes higher than in a case where the insulating coolant ICL naturally circulates as in the first embodiment. As a result, the cooling efficiency of the fuel cell 20 can be improved. However, power of the pump 48 for the forced circulation is required. Therefore, in view of energy saving, the first embodiment is more preferable than the second embodiment. The first embodiment is also more preferable than the second embodiment in view of the size of the fuel cell system.

Third Embodiment

The insulating coolant ICL may be, for example, an insulating oil, a fluorine-based inert liquid such as FLUORINERT™ of Sumitomo 3M, or the like. In particular, the fluorine-based inert liquid has advantages of high chemical stability and excellent heat transfer property.

The first forced circulation cooling system 30a has a radiator 5, and a metal-made pipe 31a that constitutes a circulation passage for circulation between the radiator 5, and a fuel cell 20. The pipe 31a is provided with a pump 32 and a temperature sensor 33. Joints 80 formed from an insulating material are provided between the fuel cell 20 and the pipe 31a. As a coolant, an insulating coolant ICL as described above in conjunction with the first embodiment is employed. If the pipe 31a is formed from an insulating material, the insulating joints 80 are not needed.

In the third embodiment, insulation is provided between the fuel cell 20 and the piping of the pipe 31a, and the insulating coolant ICL is employed. Therefore, the radiator 5 is electrically insulated from the fuel cell 20. Hence, high insulation with respect to the fuel cell system can be achieved as in the first and second embodiments. Furthermore, the third embodiment has an advantage that the system construction is simpler than in the first and second embodiments. However, if an expensive liquid, such as FLUORINERT or the like, is used as the insulating coolant ICL, the first embodiment shown in FIG. 1 is more preferable than the third embodiment. This is because the amount of the insulating coolant ICL needed is less in the first embodiment than that in the third embodiment.

The invention is not limited to the above-disclosed embodiments or constructions and may be embodied in various other manners without departing from the scope of the invention. For example, the following modifications are possible.

Modification 1

As can be understood from the foregoing embodiments, various constructions may be adopted as a construction of the cooling apparatus (cooling system) of the fuel cell 20. For example, it is possible to adopt a construction having a plurality of cooling systems, a construction having only one cooling system, etc. In general, the cooling apparatus of a fuel cell may have any construction so long as it has at least a first forced circulation cooling system for cooling the fuel cell, or so long as it uses an electrically insulating liquid is used as at least one kind of coolant employed in the cooling apparatus.

What is claimed is:

1. A fuel cell system comprising:
   a fuel cell; and
   a cooling apparatus that cools the fuel cell,
   wherein the cooling apparatus includes at least a first forced circulation cooling system that cools the fuel cell by forcibly circulating a coolant through a circulation passage that extends through the fuel cell, and
   wherein the cooling apparatus uses an electrically insulating liquid as a coolant contained in at least a portion of the cooling apparatus.

2. A fuel cell system according to claim 1, wherein the cooling apparatus further comprises:
   a second forced circulation cooling system that is independent of the first forced circulation cooling system; and
   an intermediate cooling system that is operable to exchange heat with the first forced circulation cooling system and with the second forced circulation cooling system,
   wherein the intermediate cooling system contains the electrically insulating liquid as a coolant.

3. A fuel cell system according to claim 2,
   wherein the intermediate cooling system has a container that houses therein the electrically insulating liquid, and
   wherein the electrically insulating liquid exchanges heat with the first forced circulation cooling system and with the second forced circulation cooling system while naturally circulating in the container.

4. A fuel cell system according to claim 3, wherein the electrically insulating liquid is allowed to boil in the container with a heat derived from the first forced circulation cooling system.

5. A fuel cell system according to claim 2, wherein the intermediate cooling system comprises a pump and a container that houses therein the electrically insulating liquid,
   wherein the container has a first heat exchange chamber that exchanges heat with the first forced circulation cooling system, and a second heat exchange chamber that exchanges heat with the second forced circulation cooling system, and
   wherein the pump is provided between the first heat exchange chamber and the second heat exchange chamber, and forcibly circulates the coolant through the first and second heat exchange chambers.

6. A fuel cell system according to claim 2, wherein each of the first forced circulation cooling system and the second forced circulation cooling system has a heat exchange acceleration portion that accelerates heat exchange with the electrically insulating liquid in the intermediate cooling system.

7. A fuel cell system according to claim 3, wherein each of the first forced circulation cooling system and the second forced circulation cooling system has a heat exchange acceleration portion that accelerates heat exchange with the electrically insulating liquid in the intermediate cooling system.

8. A fuel cell system according to claim 5, wherein each of the first forced circulation cooling system and the second forced circulation cooling system has a heat exchange acceleration portion that accelerates heat exchange with the electrically insulating liquid in the intermediate cooling system.

9. A fuel cell system according to claim 2, wherein the second forced circulation cooling system has a heat dissipation portion that dissipates heat to an atmosphere.

10. A fuel cell system according to claim 3, wherein the second forced circulation cooling system has a heat dissipation portion that releases heat to an atmosphere.

11. A fuel cell system according to claim 5, wherein the second forced circulation cooling system has a heat dissipation portion that dissipates heat to an atmosphere.

12. A fuel cell system according to claim 6, wherein the second forced circulation cooling system has a heat dissipation portion that dissipates heat to an atmosphere.

13. A fuel cell system according to claim 1, wherein the first forced circulation cooling system has a heat dissipation portion that dissipates heat to an atmosphere.

14. A fuel cell system according to claim 1, wherein the electrically insulating liquid has an antifreezing property.

15. A fuel cell system according to claim 2, wherein the electrically insulating liquid has an antifreezing property.

16. A fuel cell system according to claim 3, wherein the electrically insulating liquid has an antifreezing property.

17. A fuel cell system according to claim 5, wherein the electrically insulating liquid has an antifreezing property.

18. A fuel cell system according to claim 14, wherein the electrically insulating liquid includes a fluorine-based inert liquid or an insulating oil.

19. A fuel cell system according to claim 1, wherein the insulating liquid flows through the first forced circulation cooling system.

20. A fuel cell system according to claim 19, wherein the insulating liquid is an antifreezing liquid.

* * * * *